Nov. 26, 1968 C. W. LAHMON ET AL 3,413,386
WEATHERSTRIP MANUFACTURING
Filed May 7, 1965 2 Sheets-Sheet 1
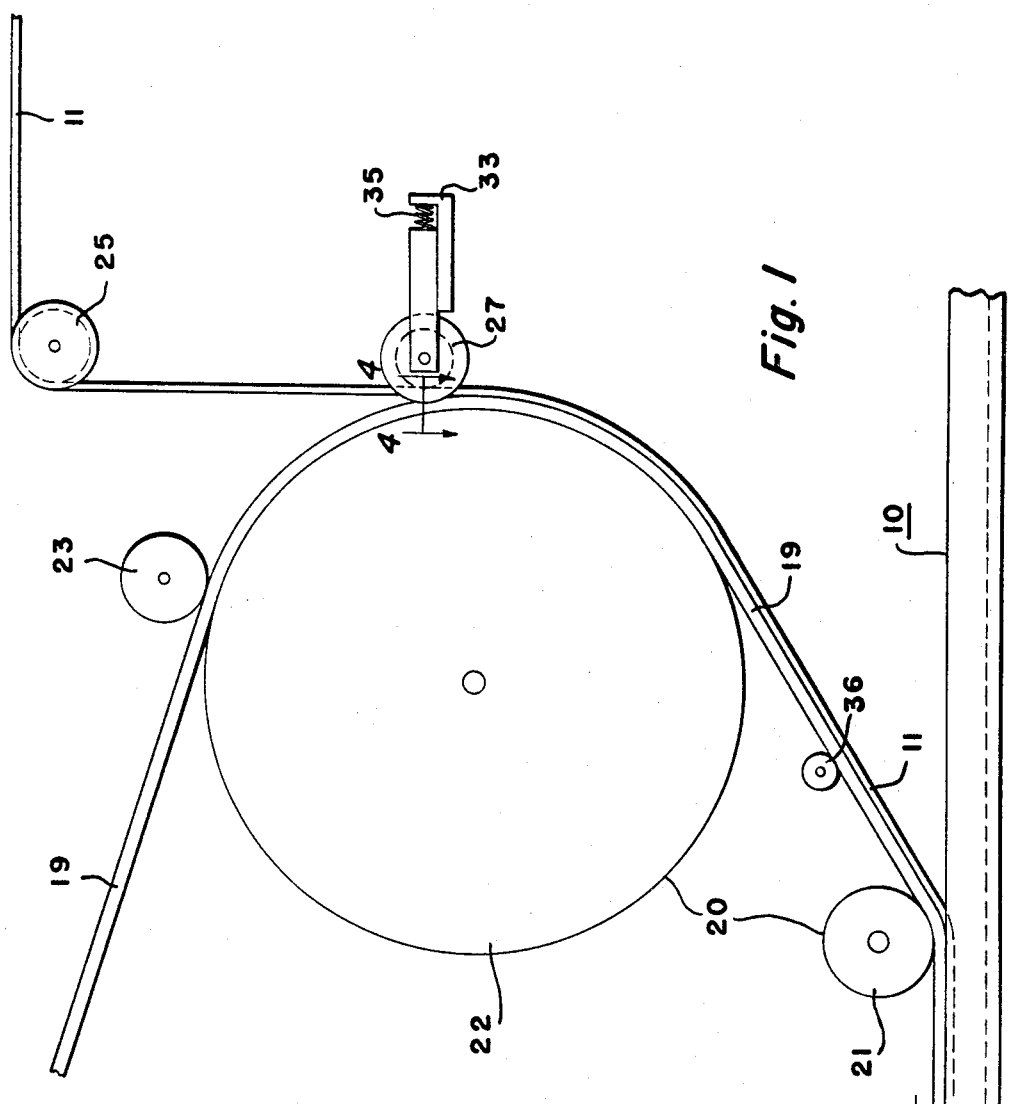
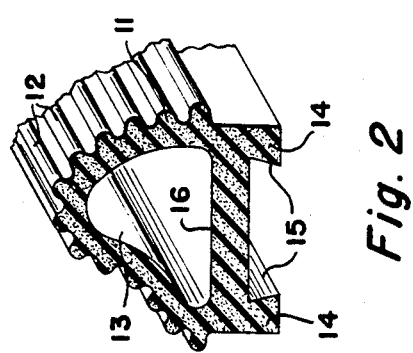
INVENTORS
*Clarence W. Lahmon*
BY *Charles E. Fontaine*
*Albert H. Reuther*
Their Attorney

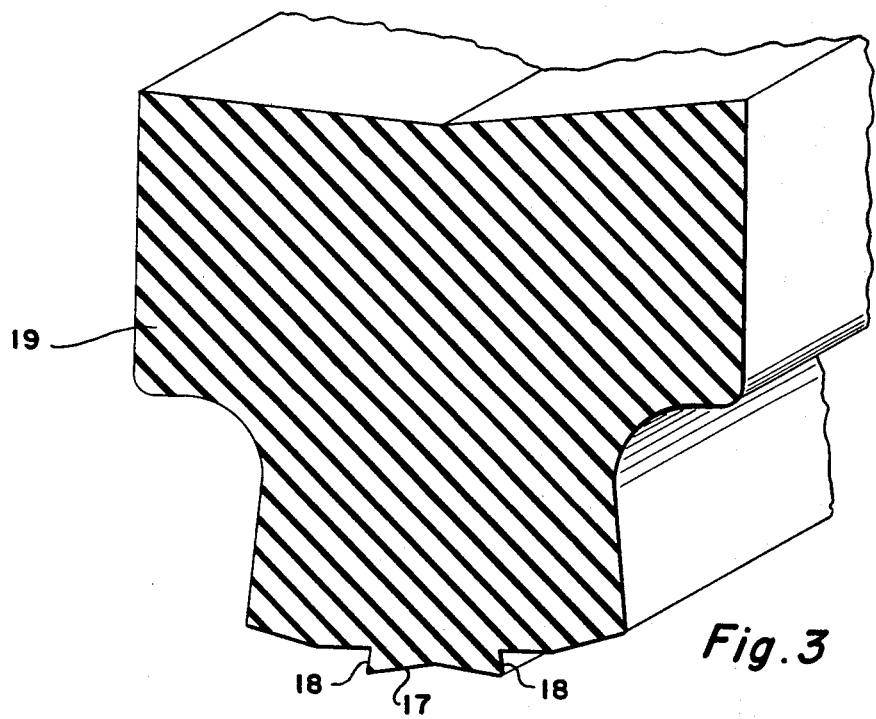
Fig. 3
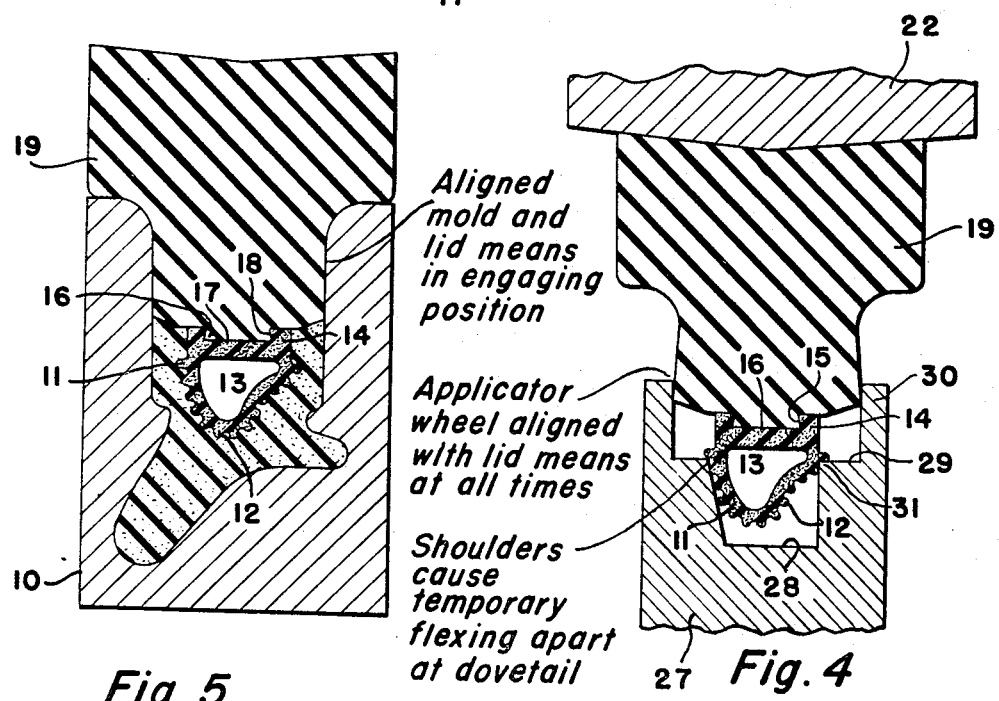
Fig. 5
Aligned mold and lid means in engaging position
Applicator wheel aligned with lid means at all times
Shoulders cause temporary flexing apart at dovetail
Fig. 4

United States Patent Office 3,413,386
Patented Nov. 26, 1968

3,413,386
WEATHERSTRIP MANUFACTURING
Clarence W. Lahmon, Fairborn, and Charles E. Fontaine, Dayton, Ohio, assignors to General Motors Corporation, Detroit, Mich., a corporation of Delaware
Filed May 7, 1965, Ser. No. 454,092
1 Claim. (Cl. 264—45)

ABSTRACT OF THE DISCLOSURE

A method for manufacturing a weatherstrip assembly consisting of a resilient foam material joined to a flexible extrusion of a dense elastomeric material having a longitudinal extending key shaped groove comprising the steps of forcing the key shaped groove of the extrusion into complementary interfit with a key shaped rib on a continuous mold "cork," passing the interfit extrusion and mold "cork" between a pressure roller and a continuous mold having a longitudinal mold cavity filled with liquid foam material whereby the extrusion is forced into the mold cavity and the "cork" is pressed into a sealing fit with the open top of the mold cavity, curing the liquid foam material and separating the weatherstrip assembly from the continuous mold "cork."

---

This invention relates to manufacture of foam weatherstrip means. More particularly, it concerns means of holding and introducing an extruded base strip portion into a cavity and retention thereof in a fixed position during foam molding procedure.

How to maintain positioning of an auxiliary or insert portion of foam weatherstrip means can be a problem if quality and mass production speed are to be maintained. This auxiliary or base insert portion is of insulating material. Though sturdy, the insert portion is sufficiently flexible to be displaced possibly from proper positioning during foam molding operation. Use thereof for vehicle attachment is made difficult unless proper positioning is assured. Accordingly, an object of the present invention is to provide a dovetail means of holding and introducing extruded auxiliary or base insert sealing strip portion of foam weatherstrip means for retention in a fixed position during foam molding procedure.

Another object of the present invention is to provide a flexible mold lid or "cork" with a keystone-shaped cross section complementary to recessing of an auxiliary or base insert portion. The insert portion is retained thereby for proper positioning and alignment during foam mold formation of vehicle weatherstrip means. The insert portion is readily separable from dovetail interlock upon completion of foam strip formation.

A further object of this invention is to provide a continuous vehicle weatherstrip manufacturing. Manufacturing steps include feeding of a flexible mold lid portion having a keystone-shaped cross-sectional portion, dovetailing a hollow auxiliary or base insert portion of extruded plastic material progressively as well as telescopically along the keystone-shaped portion, and removing the auxiliary or base insert portion from complementary interfit with the keystone-shaped portion upon completion of weatherstrip foam formation predominantly along one side thereof.

Another object of this invention is to provide a mass production assembly of weatherstrip components. This assembly includes a hollow auxiliary or base insert portion having dovetail recessing, distorting the dovetail recessing by passage thereof over an applicator wheel means, pressing the portion with the dovetail recessing onto a keystone-shaped portion of mold lid means for temporary retention thereby, foaming remainder of weatherstrip means thereto, and releasing the dovetail interfit thereby leaving properly positioned sealing strip components.

Further objects and advantages will be apparent from the following description, reference being had to the accompanying drawings wherein preferred embodiments of the present invention are clearly shown.

In the drawings:

FIGURE 1 illustrates progressive formation of dovetailing base portion and foam weatherstrip means in accordance with the present invention.

FIGURE 2 is a fragmentary sectioned perspective view of dovetail recessing of auxiliary or base insert means for sealing strip assembly in accordance with the present invention.

FIGURE 3 is a fragmentary sectioned perspective view of keystone-shaped structure of mold lid means for use in accordance with the present invention.

FIGURE 4 is a fragmentary cross-sectional view taken along line 4—4 in FIGURE 1.

FIGURE 5 is a cross-sectional view to outline molding operation of finished weatherstrip means having assembly of components accurately accomplished in accordance with the present invention.

In FIGURE 1 there is shown a continuous mold 10 having a longitudinal extending mold cavity of a selected cross section configuration for the manufacture of weatherstrip assemblies. A continuous mold of this type is shown and described in United States Patent No. 3,110,938, Beck, which issued Nov. 19, 1963 and is assigned to the assignee of the present invention. Reference can be made to the foregoing patent as to a showing of similar weatherstrip or sealing strip means. Difficulty can be encountered in maintenance of proper positioning of a relatively dense tubular elastomeric portion as to a remainder of the weatherstrip means. Plastic fasteners or nails as shown by the foregoing patent are to be installed through aperturing of such tubular elastomeric material. Installation of such plastic nails can occur in accordance with disclosure of copending applications S.N. 319,327 filed Oct. 28, 1963, S.N. 315,002 filed Oct. 9, 1963, S.N. 126,419 filed June 22, 1961 as well as S.N. 118,918 filed June 22, 1961 and S.N. 118,836 filed June 22, 1961. Reference can also be made to a Patent 3,059,292 belonging to the assignee of the present invention. Reference can be made to the foregoing disclosures concerning differing materials used for the component of the weatherstrip means.

In FIGURE 1 a relatively dense tubular portion 11 is shown comparable to that in Patent 3,110,938-Beck et al. This same tubular elastomeric portion 11 is illustrated in FIGURE 2. As can be seen in FIGURE 2, the dense tubular elastomeric portion 11 has a plurality of longitudinally extending rib means 12 along an outer periphery thereof as well as a hollow and substantially triangular shaped longitudinal cavity 13. In accordance with the present invention, the tubular portion 11 has added thereto a pair of opposite longitudinally extending projections 14 which are substantially parallel to each other except for opposite angular walls 15 thereof which collectively define a substantially key-shaped grooving or recessing 16.

This substantially keystone-shaped grooving or recessing 16 can be seen also in views of FIGURES 4 and 5 of the drawings.

In accordance with the present invention, the keystone-shaped grooving or recessing 16 is substantially complementary to a dovetail means or keystone-shaped portion 17 having outwardly flared ends 18 on a "cork" or lid-like retention member 19 best seen in views of FIGURES 3 and 4 of the drawings.

This retention member or "cork" means 19 can be a closed-loop or continuous member as represented in FIGURE 1 of the drawings. The weatherstrip elastomeric portion 11 can be engaged and disengaged relative to the keystone-shaped portion. The outwardly flared ends 18 engage the flange projections or extensions 14 of the weatherstrip elastomeric portion particularly at the angularly flared surfacing of walls 15. Grooving 16 of the weatherstrip elastomeric portion is substantially complementary to the keystone-shaped portion 17 including the outwardly flared ends 18. Guide roll means generally indicated by numeral 20 in FIGURE 1 include a first pressure roller 21 as well as a main "cork" drum portion 22 around which the "cork" means or placement member 19 passes. Further guide roll means 23 has grooving in alignment with center line of mold cavities such that the "cork" means or alignment member 19 has the keystone-shaped portion 17 externally in alignment with the mold cavity as well as the grooving or recessing 16 of the weatherstrip means 11. Suitable pulley means 25 in an intermediate location can permit adjustment of a vertical center line of a base sealing strip portion 11 such that recessing 16 of the strip travels vertically into a location to an applicator wheel means 27 shown in FIGURES 1 and 4. This applicator wheel means 27 has three steps of recessing including a deep and narrow portion 28 as well as an intermediate portion 29 and outer flanged main portion 30. The deepest portion 28 of the grooving in the applicator wheel means engages the apex of the weatherstrip means 11. A shoulder 31 between the deepest grooving portion 28 and the intermediate portion 29 results in a flexing of the weatherstrip means 11 sufficiently for distortion and application of the base strip at a location of common tangency of the "cork" means as represented in FIGURE 1. Below this point of common tangency represented in FIGURE 1, the "cork" means 19 and base strip means travel together. The applicator wheel means 27 can be journalled on a base plate portion 33 subject to radial pressure of spring loading means 35 represented in FIGURE 1. An additional pressure roll means 36 can be located between the roller 21 and drum 22 as shown in FIGURE 1. The "cork" means 19 having the base strip portion dovetailed and secured temporarily to the keystone-shaped portion 17 thereof travels together with the base strip means into a mold location where a liquid foam resilient material can be added to meet the relatively rigid base strip portion at a common location to form required dimensional cross sectioning of the weatherstrip means during a predetermined gelation period. The foam material results in formation of a strip similar to that illustrated in Patent 3,110,938 Beck et al. noted earlier.

By use of dovetail features in accordance with the present invention, molded strip length can be controlled in a range between plus or minus 1% to 1.5% of nominal mold length. Durability and life expectancy of extruding dies for the base strip means can be increased and critical extruding problems diminished and avoided. Material savings result together with labor savings. There is improvement of mechanical process control. Quality of the end product is improved and the "cork" means has a relatively long life.

Features of the present invention are particularly advantageous during maufacture of foam weather strips for vehicles where a continuous molding process is used. The resultant product provides an integral cross section of foam material joined to a relatively rigid and sturdy, flexible, non-metallic extrusion to which plastic nails can be fitted. This flexible extrusion or base strip means 11 is used as the intermediate structure or base medium for fastening devices during attachment of the molded sections to vehicles as disclosed in related applications noted earlier. The continuous process is facilitated by having the base strip means 11 introduced and retained in the foam material at a relative predetermined position to the mold cavity for a prescribed foam gelation period. After gelation, the base strip or elastomeric portion 11 is integrally joined and carried as part of the foam weatherstrip means. The keystone shape for dovetail interfit of the "cork" and grooving 16 of the base strip portion 11 is particularly adapted for maintenance of fixed positioning during the molding operation.

While the embodiments of the present invention herein disclosed constitute preferred forms, it is to be understood that other forms might be adopted.

What is claimed is as follows:

1. A method for manufacturing weatherstrip assemblies consisting of a resilient foam material joined to a flexible extrusion of a dense elastomeric material having a longitudinal extending key shaped groove comprising the steps of passing a continuous mold "cork" having a longitudinally extending key shaped rib and said flexible extrusion between a main drum and an applicator wheel with said key shaped rib and said key shaped groove in alignment whereby said key shaped groove of said flexible extrusion is forced into complementary interfit with said key shaped rib of said continuous "cork," passing the interfit extrusion and mold "cork" between a pressure roller and a continuous mold having a longitudinal mold cavity filled with liquid foam material whereby said extrusion is forced into said mold cavity and said "cork" is pressed into a sealing fit with the open top of said mold cavity, curing said liquid foam material and separating the weatherstrip assembly from said continuous mold "cork."

References Cited
UNITED STATES PATENTS 2,734,239  2/1956  Lombardi _____ 20—69

JULIUS FROME, *Primary Examiner.*

L. GARRETT, *Assistant Examiner.*